United States Patent [19]

Sudo

[11] Patent Number: 5,138,651
[45] Date of Patent: Aug. 11, 1992

[54] CORDLESS LOUD SPEAKING TELEPHONE

[75] Inventor: Yozo Sudo, Yamato, Japan

[73] Assignee: Fujitsu Limited, Kawasaki, Japan

[21] Appl. No.: 598,642

[22] PCT Filed: Feb. 21, 1990

[86] PCT No.: PCT/JP90/00206

§ 371 Date: Oct. 19, 1990

§ 102(e) Date: Oct. 19, 1990

[87] PCT Pub. No.: WO90/10347

PCT Pub. Date: Sep. 7, 1990

[30] Foreign Application Priority Data

Feb. 23, 1989 [JP] Japan ............................. 1-044073
Aug. 4, 1989 [JP] Japan ............................. 1-201443

[51] Int. Cl.$^5$ ...................... H04M 11/00; H04M 9/08
[52] U.S. Cl. ........................... 379/61; 379/388;
379/420; 379/432; 379/435; 379/440; 455/89;
455/90; 343/702; 343/720; D14/138; D14/149;
D14/150
[58] Field of Search ............... 379/58, 61, 387–390,
379/392, 419, 420, 428, 432, 434, 435, 440;
455/89, 90, 128; 343/702, 720, 741, 742, 744,
858; D14/137, 138, 140, 142, 149, 150

[56] References Cited

U.S. PATENT DOCUMENTS

| 2,093,158 | 9/1937 | Pratt | 343/720 |
|---|---|---|---|
| 2,840,694 | 6/1958 | Morgan | 343/702 |
| 3,247,515 | 4/1966 | Boyer | 343/744 |
| 3,993,998 | 11/1976 | Kimmett | 343/744 |
| 4,078,155 | 3/1978 | Dotros et al. | 379/388 |
| 4,555,592 | 11/1985 | Deinzer | 379/61 |
| 4,650,931 | 3/1987 | Tsukada et al. | 379/388 |
| 4,679,233 | 7/1987 | Richardson et al. | 343/702 |

FOREIGN PATENT DOCUMENTS

| 0981271 | 5/1951 | France | 379/434 |
|---|---|---|---|
| 0413039 | 10/1945 | Italy | 379/61 |
| 0048852 | 3/1982 | Japan | 379/420 |
| 0148452 | 9/1982 | Japan | 379/61 |
| 0176870 | 10/1982 | Japan . | |

Primary Examiner—James L. Dwyer
Assistant Examiner—Dwyane D. Bost
Attorney, Agent, or Firm—Staas & Halsey

[57] ABSTRACT

A cordless loud-speaking telephone of the present invention is shaped to be placed on a table or desk or to be suspended from a ceiling. Unlike cordless portable telephones of the handy transceiver type, it enables hands-free talking or communication through a receiving speaker and a transmitting microphone located outside a casing. An antenna conductor and counterpoises are projected from the casing, and a microphone is attached to the counterpoises or the antenna conductor such that the microphone is separated as remotely as possible from the speaker in the casing. As a result, howling and echo which disturb talking or communication via the telephone can be suppressed. Further, plural microphones are attached to plural antenna conductors or counterpoises to cancel the sound of the receiving speaker to prevent the voice from again entering the microphones, or the microphones are attached to the counterpoises or the antenna conductors in such a manner that they effectively receive the voice from the mouth of a talking person from a certain direction. This enables hands-free talking or communication to be more effectively and reliably achieved.

17 Claims, 10 Drawing Sheets

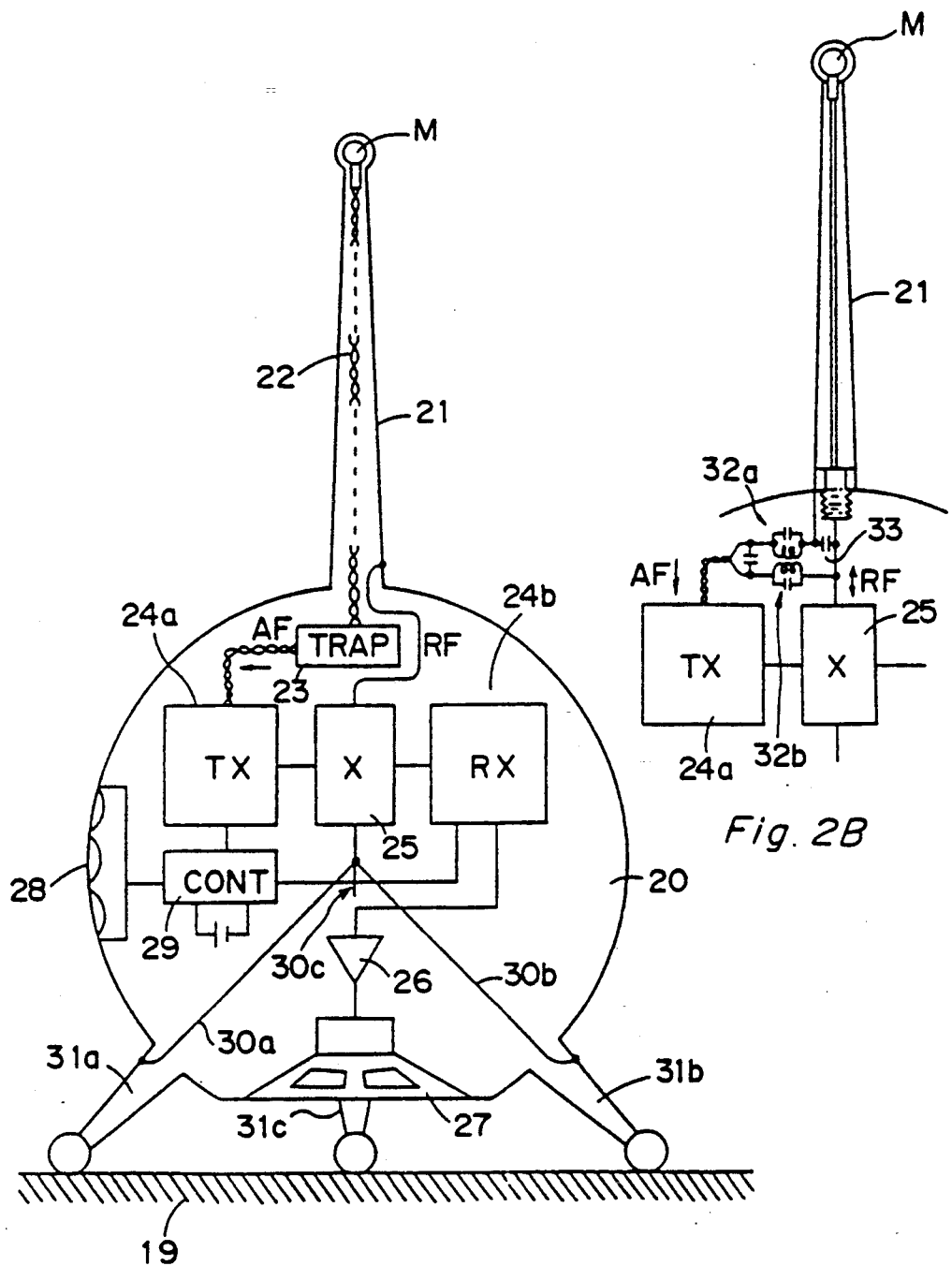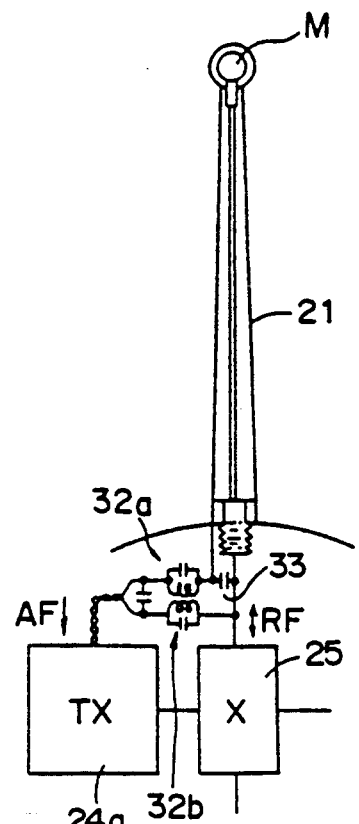
Fig. 2A
Fig. 2B

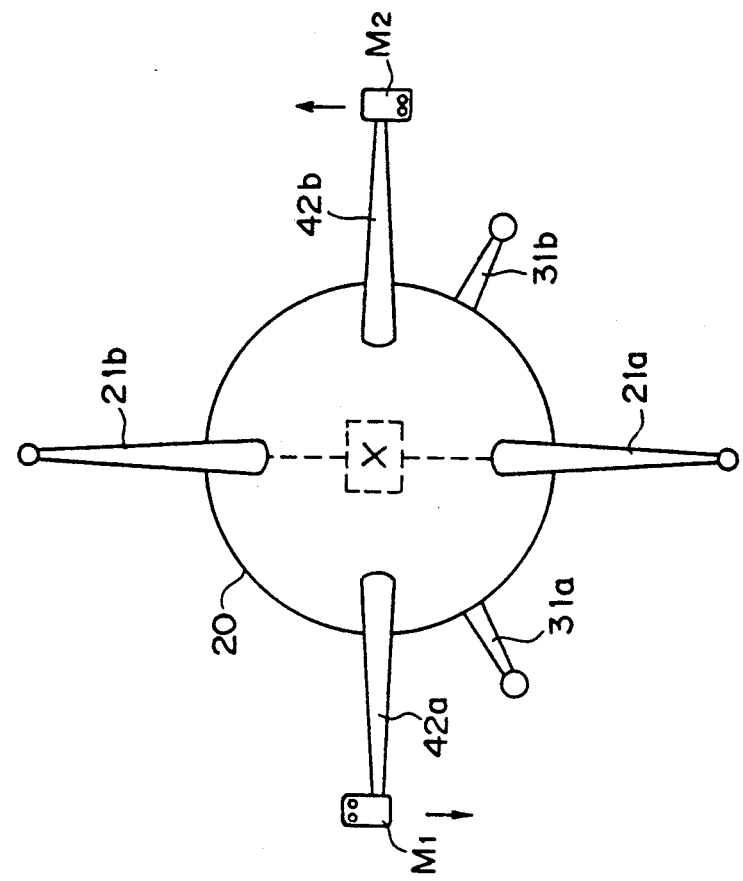
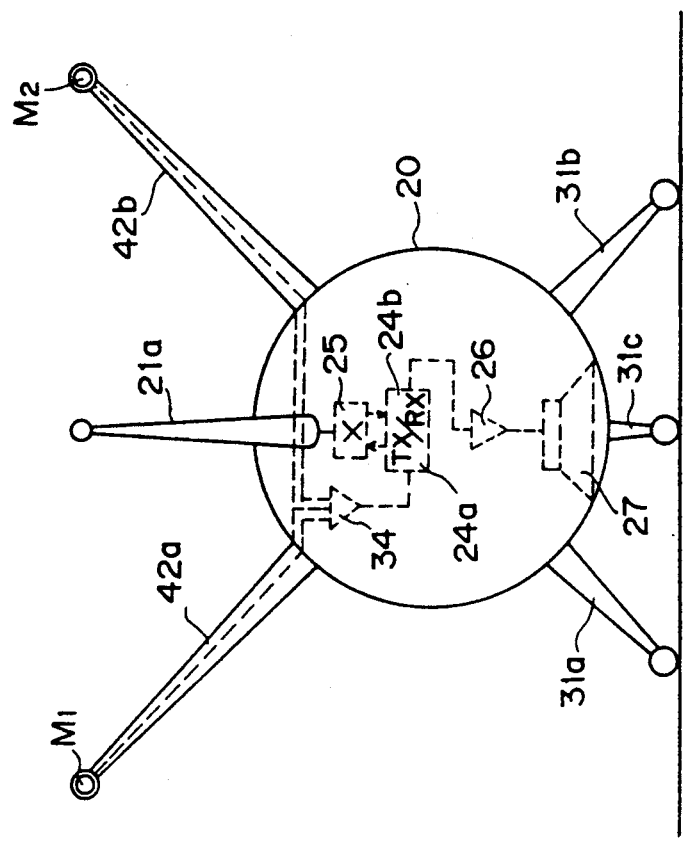
Fig. 9A
Fig. 9B

CORDLESS LOUD SPEAKING TELEPHONE

FIELD OF THE INVENTION

The present invention relates to a cordless loud-speaking telephone and, more particularly, to a cordless loud-speaking telephone not of the usual portable type, but of the table-top or hanging-from-ceiling type and provided with a receiving speaker housed in a box and a transmitting microphone attached to an antenna projected from a ball casing to allow the user to talk with a companion through the telephone with his hands left free.

BACKGROUND OF THE INVENTION

A cordless telephone exists which allows the user to come to the door, to ask "who is it" when the door bell is ringing while he is talking on the telephone. Conventional cordless telephones ;f this kind are intended to be portable, thus allowing the user to talk to his companion while moving around. Most of these are of the wireless portable (or handy transceiver) type in which the transmitter and the receiver are housed in a box or handset and an antenna projects from the handset. However, there exists no telephone similar to that of the present invention, which is of the floor or table-to; type and which allows the user to talk with his companion, leaving his hands free.

There exist portable wireless telephones which house a speaker in a box to make the received voice loud, but they are usually of the press talk type. A hands-free telephone that allows transmitting and receiving communications to be made at the same time and that can be conveniently used for various meetings has not yet been realized.

Hands-free wire (or cord) telephones of various kinds have been produced. These telephones house a speaker and a microphone in a box, making it easy to use as an interphone.

With these telephones, however, the voice received through the speaker, which is adjacent to or near the microphone (or separated from the microphone by about 10 cm), is received more strongly by the microphone than the voice of the person who is remote (50 cm or more) from the microphone. As a result, the voice received through the speaker i: fed back through the telephone circuit, causing howling and echo, thereby disturbing the talking through the telephone. To solve this problem, an alternately-talking system actuated by a voice control switch which causes the received voice to vanish at its start and end, or alternatively an echo canceller system (high in cost) is required.

DISCLOSURE OF THE INVENTION

The present invention is therefore intended to eliminate the above-mentioned drawbacks which could not be avoided in conventional hands-free telephones.

Accordingly, a first object of the present invention is to provide a cordless hands-free loud-speaking telephone which is lower in cost and enables more reliable same-time talking but does not use the above-mentioned specific circuit systems.

The design and construction of conventional hands-free telephones requires that the speaker and the microphone be located together adjacent to the desk or table top from the viewpoint of their constructions adapted considering their designs. This is why their transmitting voice collecting characteristic is relatively poor.

A second object of the present invention is therefore to provide a hands-free loud-speaking telephone with a better transmitting voice collecting characteristic.

In the case of portable cordless telephones, the hand by which the telephone was grasped, and the human body, acted to enhance the earthing effect. When the telephone was not grasped by hand, radio radiation efficiency was lowered, causing reception to deteriorate.

A third object of the present invention is therefore to provide a table-top-type cordless loud-speaking telephone with excellent radio radiation efficiency and reception gains.

These and other objects of the present invention can be achieved by a cordless loud-speaking telephone comprising an appropriately-shaped casing, radio transmitting and receiving circuits and a receiving speaker housed in the casing, an antenna conductor extending outside the casing and counterpoises similarly extending outside the casing, and a microphone attached to the counterpoise or antenna conductor. The output of the microphone is applied as modulated input to the radio transmitting circuit through a band separator means arranged at a current supply section in the antenna conductor to bandseparate voice current from carrier wave, so that the microphone can be isolated from the receiving speaker. The cordless loud-speaking telephone of the present invention is arranged such that an appropriate number of microphones are set and that phases of their output signals are considered not to feed back sound emitted from the receiving speaker to the microphones to prevent howling. The cordless loud-speaking telephone is further arranged in such a way that the position of the receiving speaker relative to the microphones is adapted considering the phase of sound wave and the directional characteristics of the antenna so as to attain the merits described above.

BRIEF DESCRIPTION OF THE DRAWINGS

FIGS. 2(a) and 2(b) show the arrangement of a first example of the cordless loud-speaking telephone according to the present invention.

FIGS. 9(a) and 9(b) show the arrangement of an eighth example of the cordless loud-speaking telephone according to present invention.

THE BEST MODE FOR PRACTICING THE PRESENT INVENTION

Figure 1:
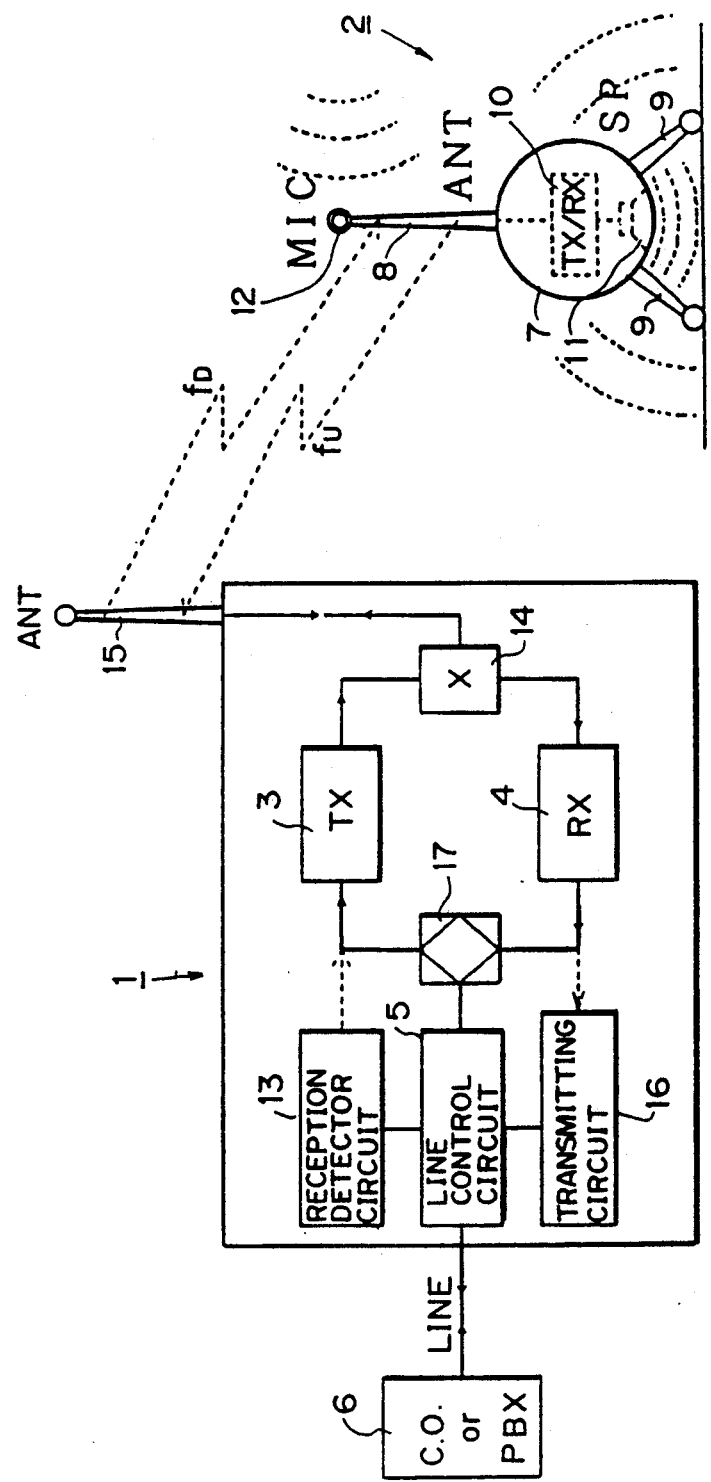
FIG. 1 shows an arrangement of the hands-free cordless telephone system into which an example of the cordless loud speaking telephone according to the present invention is incorporated.

FIG. 1 shows the hands-free cordless telephone system into which an example of the cordless loud-speaking telephone according to the present invention is incorporated. In FIG. 1, a main device 1 and a sub-device 2 are arranged to enable same-time talking through a radio line. The main device 1 includes a radio transmitting circuit 3, a radio receiving circuit 4, a line control circuit 5 or the like. The line control circuit 5 is connected to the central office (C.O.) 6 or private branch exchange (PBX) 6.

The sub-device 2, the cordless loud-speaking telephone, has a casing 7 and has, or the casing 7, an antenna conductor 8 extending upward from the casing 7 and legs 9 or projections 9 which serve as legs or counterpoises.

A radio transmitting and receiving circuit 10 and a receiving speaker 11 are arranged in the casing 7 and the sound emitting opening of the receiving speaker 11 is located at the lowest portion of the casing 7 between the projections or legs 9 to emit sound relative to the surface of the table. A microphone 12 is fixed to the top of the antenna conductor 8 and it is sufficiently separated from the receiving speaker 11 to prevent sound emitted from the receiving speaker 11 from entering the microphone 12.

When the main device 1 is ready for receiving from the central office (C.O.) 6 or private branch exchange (PBX) 6, the line control circuit 5 holds the line connected to a reception detector circuit 13. When reception comes from the central office (C.O.) 6 or private branch exchange (PBX) 6, the reception detector circuit 13 detects it and sends a ringing signal to the modulated signal input of the radio transmitting circuit 3. The carrier wave is modulated by this ringing signal and transmitting signal (or downlink signal) $f_D$ and propagates in the air from an antenna 15 through a circuit 14 common to the transmitting and receiving antenna. The transmitting signal $f_D$ is excited in the antenna conductor 8 of the sub-device 2 and led to the radio receiving circuit (RX) of the radio transmitting and receiving circuit 10. The ringing signal is reproduced by the radio receiving circuit (RX) and sounded through the receiving speaker 11. When a response operation is performed on the side of the sub-device 2, a response signal is applied to the modulated signal input of the radio transmitting circuit (TX) of the radio transmitting and receiving circuit 10, as seen in the case of the main device 1. The transmitting signal (or uplink signal) $f_U$ thus modulated propagates in the air from the sub-device 2. The transmitting signal $f_U$ is excited in the antenna 15 of the main device 1 and led to the radio receiving circuit 4. The response signal is reproduced through the radio receiving circuit 4 and transmitted to the line control circuit 5, so that the line control circuit 5 can form a message or communication circuit between the line and the sub-device 2. Thereafter, the message on the side of the sub-device 2 is transmitted, as the uplink signal, to the receiver on the side of the talking companion through the telephone line, while the message on the side of the talking companion is transmitted as the downlink signal $f_D$ and heard through the receiving speaker 11 via the telephone line. Since the microphone 12 on the side of the sub-device 2 is sufficiently separated from the receiving speaker 11, neither howling nor echo occurs. When you want to call a talking companion using the sub-device 2, a connection command and dial signals are sent to the main device 1. In short, dialing is made through a transmitting circuit 16 (which may be added to the sub-device 2) such as the so-called DTMF. The main device is provided with a hybrid circuit 17 for using the two-wire circuit common to transmission and reception.

FIRST EXAMPLE

FIGS. 2(a) and 2(b) show an example of the cordless loud-speaking telephone according to the present invention. An ultra-small-s-zed transmitting microphone M is attached to the top of a transmitting and receiving antenna conductor 21 projected vertically upward from a casing 20, and output of the transmitting microphone M is applied to a radio transmitting circuit 24a through a balanced microphone cable 22 housed in the hollow antenna conductor 21 and through a high frequency trap circuit 23. Modulated high frequency output of the radio transmitting circuit 24a is sent to the main device 1 shown in FIG. 1 through a circuit 25 common to the transmitting and receiving antenna, and the antenna conductor 21.

On the other hand, radio waves radiated from the main device 1 and carrying a received voice excite in the antenna conductor 21 a high frequency different from the transmitting frequency. This high frequency is picked up by the radio receiving circuit 24b via the circuit 25 common to the transmitting and receiving antenna. A voice signal demodulated by a demodulator circuit such as frequency discriminator is amplified by an amplifier 26 and output through a receiving speaker 27.

The hook-on and hook-off operations, the dial operation, etc., are carried out in a sending or receiving operation section 28 and a controller 29 controls the radio transmitting and receiving circuits 24a and 24b to respond to the operation made at the sending or receiving operation section 28. Lines 30a–30c are ground conductors for connecting the ground terminal of the circuit 25 common to the transmitting and receiving antenna to legs or counterpoises 31a–31c of the casing 20, and the whole assembly serves as a counterpoise. The commercial electret condenser microphone has a diameter of 5–10 mm and can be easily attached to the top of the whip antenna as the microphone M. The antenna conductor projected upward from the casing can be made flexible by reinforcing it with springs, for example.

The transmitting and receiving antenna conductor 21 may be of the coaxial type and FIG. 2(b) shows an example of it. The output line of the microphone, in this case, uses inner and outer conductors of the transmitting and receiving antenna conductor 21 like a coaxial cable. An LC filter and LC parallel resonance circuits which serve as trap circuits 32a and 32b are inserted in this case between the inner and outer conductors and the modulating input terminal of the radio transmitting circuit 24a so as to prevent transmitted radio wave from entering the microphone. The trap circuits 32a and 32b are therefore of high impedance relative to frequencies transmitted and received, but of low impedance relative to the low frequency outputted through the microphone. The inner and outer conductors are short-circuited at high frequency by a condenser 33 and a transmitting radio wave is applied to the short-circuited inner and outer conductors through the circuit 25 common to the transmitting and receiving antenna to enable the coaxial antenna conductor to serve as a vertical conductor relative to the transmitted radio wave. Where the frequency of the radio wave received by the transmitting and receiving antenna conductor 21 is remarkably different from the frequency of the radio wave transmitted through the antenna conductor 21, the number of LC parallel resonance circuits which serve as the trap circuits 32a and 32b may be increased to four, in which two are in resonance with each other and the other two are also in resonance with each other. The coaxial transmitting and receiving antenna conductor 21 can be made telescopic like the rod antenna. The legs or counterpoises 31a–31c of the casing 20 can also be made telescopic to enable the height of the casing 20 to be adjusted relative to the top of a table or desk 19. Furthermore, their length can be adjusted for the circumstances.

SECOND EXAMPLE

Figure 3:
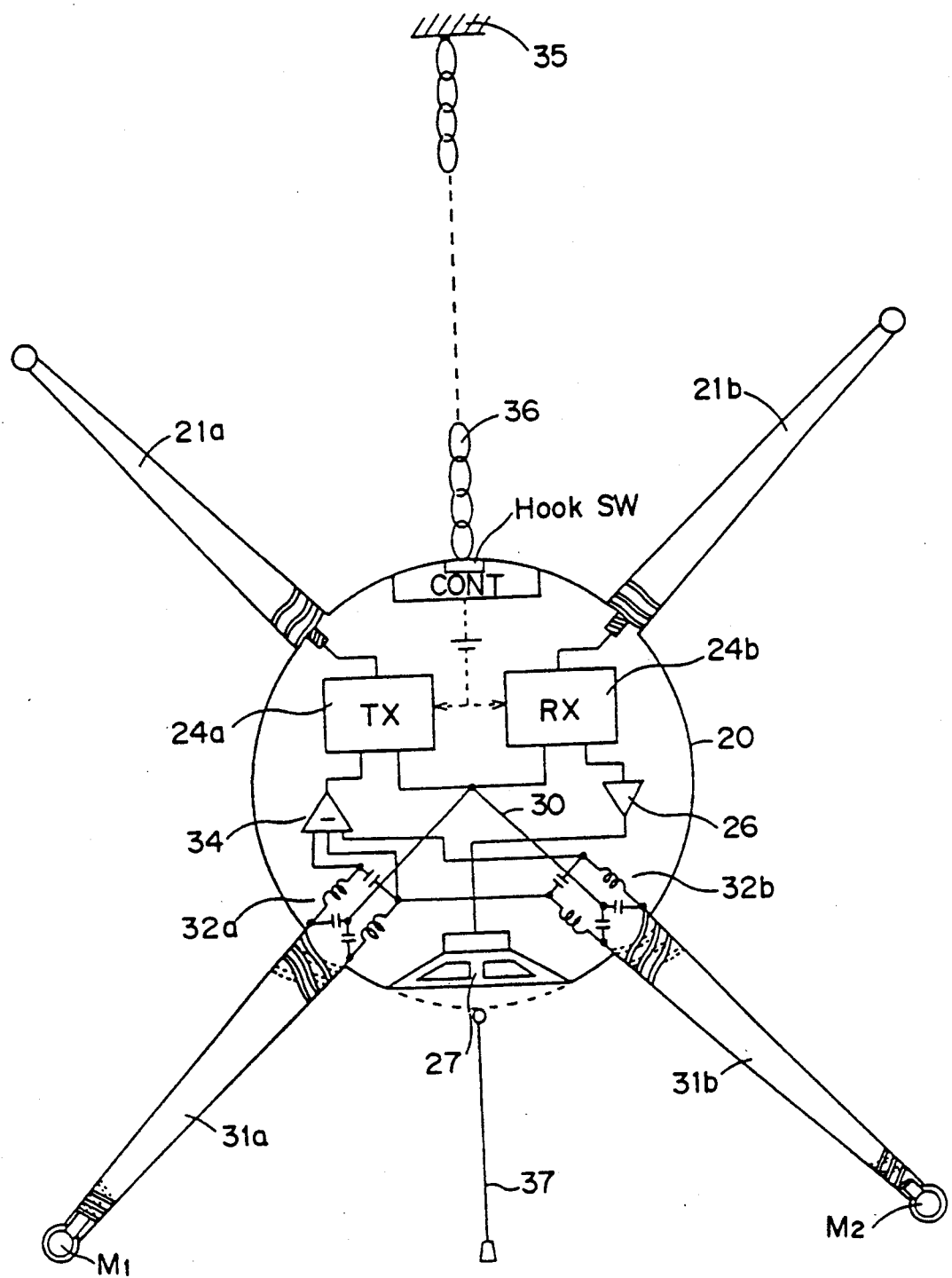
FIG. 3 shows the arrangement of a second example of the cordless loud-speaking telephone according to the present invention.

FIG. 3 shows a second example of the cordless loud-speaking telephone according to the present invention. The antenna in this example comprises a transmitting antenna 21a and a receiving antenna 21b. These two antennas 21a and 21b are made perpendicular to each other to make their influences relative to each other negligible. This makes it unnecessary to use the circuit 25 common to the transmitting and receiving antenna. Transmitting and receiving frequencies (or uplink and downlink frequencies) are in different bands: 380 MHz as the uplink frequency and 250 MHz as the downlink frequency, for example. Message transmitting microphones $M_1$ and $M_2$ are attached to the tops of transmitting and receiving counterpoises 31a and 31b. The difference between the outputs of these microphones are calculated by a subtracter 34. A signal which represents this difference is modulated input to a radio transmitting circuit 24a. The reason why the difference in output of the two microphones is used is that the voice from the speaker is cancelled not to again enter it. Messages sounded from positions of equal distance from the two microphones are sometimes cancelled by each other but this can be solved when the directional characteristics of the transmitting microphone $M_1$ is directed forward in FIG. 3 and when that of the receiving microphone $M_2$ is directed rearward, as shown in FIG. 3. The counterpoises 31a and 31b in this example guide outputs applied from the microphones and also serve as the counterpoises relative to radio waves (or high frequency). To shorten the wavelength of radio wave, the conductor of each of the counterpoises is of double-helical construction, like a coil. A speaker 27 is located on the bottom of the casing 20 which is hung from the ceiling, but it may be located on the top of the casing 20 to be effectively separated from the microphones $M_1$ and $M_2$. The hook-on and hook-off operations of the telephone are carried out by pushing buttons in the sending or receiving operation section 28 shown in FIG. 2(a). The example shown in FIG. 3 is of the type which is hung from the ceiling 35 by a hanging chain 36, but the hook-on and hook-off operations may be carried out in this case by using a pulling string 37 and a hook switch incorporated into CONT section, as seen where light bulbs are turned on and off by a switch connected to a pulling string.

THIRD EXAMPLE

Figure 4:
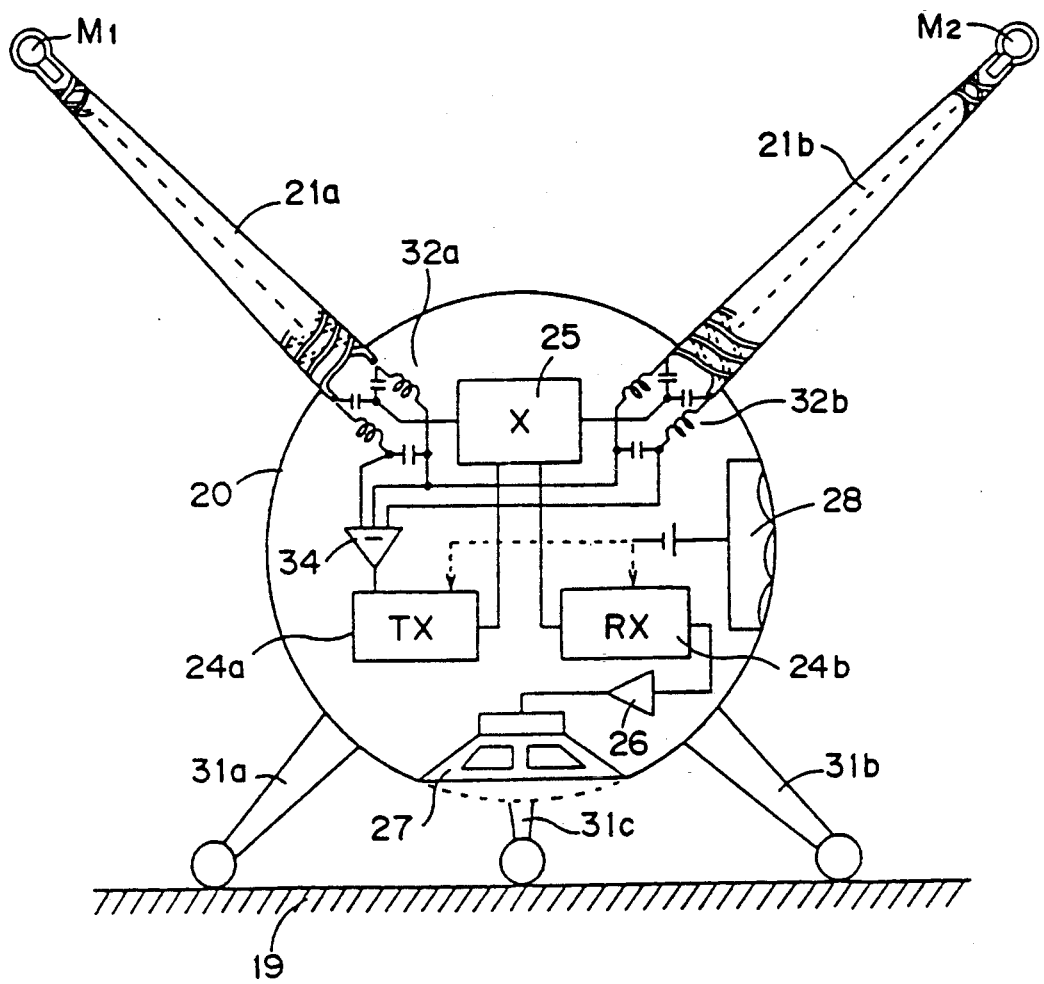
FIG. 4 shows the arrangement of a third example of the cordless loud-speaking telephone according to the present invention.

FIG. 4 shows a third example of the cordless loud-speaking telephone according to the present invention. Antennas 21a and 21b form a transmitting and receiving V-shaped dipole antenna. Each is of helical construction, serving as a lead for the microphone. If the radio wave frequency is high and its wavelength is short, antennas 21a and 21b do not have to be of the helical construction, but a full-size dipole antenna can be used. The legs 31a–31c of the casing 20 in this example serve not as counterpoises but only to support the casing 20.

As seen in the second example the difference between the outputs of the two microphones is used as a modulated input for the radio transmitting circuit. Therefore, a voice sounded through the speaker is cancelled so that it does not again enter the speaker, but messages transmitted do not cancel each other.

Figure 5:
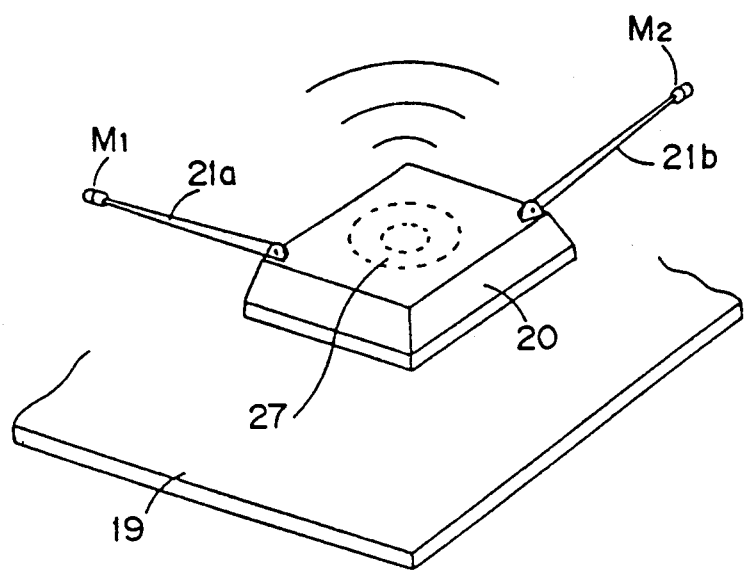
FIG. 5 shows the arrangement of a fourth example of the cordless loud-speaking telephone according to the present invention.

The casing 20 is not necessarily shaped like a ball but it may be shaped like any other discretional shape or a rectangular parallelepiped as shown in FIG. 5 (fourth example).

The casing 20 may be made of insulating material such as plastics or conductive material such as metal. When it is made of metal, the base of the antenna is not in direct contact with the casing, but the antenna is fixed to the casing through insulating material. Where the telephone is of a type that uses extremely faint radio wave, the lengths of the antenna conductor and counterpoises are set at optimum, usually depending upon the VHF or UHF frequency bands used. Where the telephone is of a type that uses low power, frequencies transmitted and received are 250 MHz, 380 MHz and so on. Ringing of the telephone may be sounded through the speaker 27, but if the telephone is of the semi-stationary type and its ringing is sounded by the main device located in the same room, battery waste can be minimized.

FIFTH EXAMPLE

Figure 6:
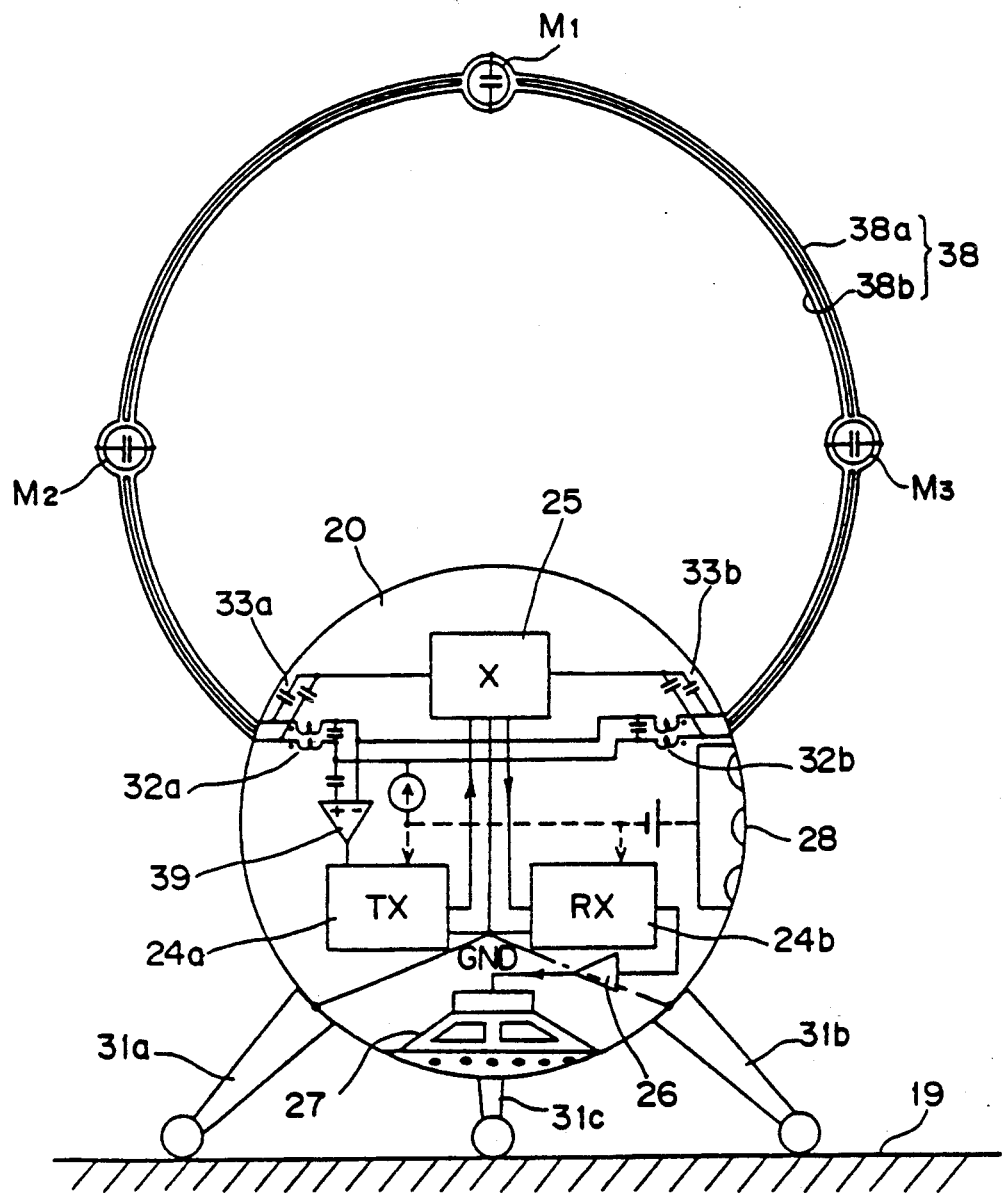
FIG. 6 shows the arrangement of a fifth example of the cordless loud-speaking telephone according to the present invention.

FIG. 6 shows a structural view for a fifth example of the cordless loud-speaking telephone according to the present invention. A frame-shaped (substantially loop-shaped) antenna 38 comprises transmitting and receiving antenna conductors 38a and 38b which are made as a unit. The antenna conductor 38a (as a large arc loop) is located outside and the antenna conductor 38b (as a small arc loop) is located inside and an insulating layer is interposed between them. Plural transmitting microphones are provided. One $M_1$ is located at the highest point of the loop-shaped antenna 38 and the other two $M_2$ and $M_3$ are located at those positions on the antenna conductor 38 which are symmetrical to the microphone $M_1$. These microphones may have no directional characteristics or they may have single directional characteristic. The antenna conductors 38a and 38b serve as leads for picking up outputs from the microphones.

Both ends of the antenna 38 are fixed to the casing 20. Both ends of each of the antenna conductors 38a and 38b are short-circuited in high frequency by condensers 33a and 33b and connected to the circuit (or frequency band separating means) 25 common to the transmitting and receiving antenna. Microphone outputs are applied from the both ends of the antenna conductors 38a and 38b to a microphone amplifier 39 through common mode choke coils or parallel resonance trap circuits 32a and 32b which serve to separate high frequency current flowing through the antenna conductors 38a and 38b from voice current applied from the microphones. The output of the microphone amplifier 39 is sent as a modulated input to the radio transmitting circuit 24a. Modulated high frequency output (or radio wave) of the radio transmitting circuit 24a is sent to the circuit 25 common to the transmitting and receiving antenna and radiated through the antenna conductors 38a and 38b to propagate in the air to the main device shown in FIG. 1. When amplitude modulation (AM) is employed, a part of the transmitting output is fed back to the microphone amplifier 39 and its non-linear portion is detected, thereby causing undesirable phenomena such as howling. It is therefore preferable to employ frequency modulation (FM), and the carrier wave (or radio wave) is modulated by FM in this example.

When circumferential lengths of the antenna conductors 38a and 38b are set substantially equal to the wavelength of the transmitting radio wave used, the efficiency of these antenna conductors 38a and 38b can be remarkably enhanced, and wave radiation is largest perpendicular to the loop face of the antenna 38 in this case. When the frequency of the transmitted radio wave is 300 MHz, the diameter of the loop-shaped antenna 38 is about 30 cm. When the interval between the microphones $M_1$ and $M_2$ or $M_1$ and $M_3$ is longer than half the wavelength of a sound wave, unnecessary sound added from the sides of the loop face of the antenna 38 can be reduced.

A voice radio wave transmitted from the main device excites in the antenna conductors 38a and 38b a high frequency signal having a frequency different from that of the radio wave transmitted from the sub-device. This signal is band-separated from the radio wave transmitted by the circuit 25 common to the transmitting and receiving antenna and received by the radio receiving circuit 24b where it is demodulated to a voice signal. This voice signal is amplified by the amplifier 26 and output at a high volume through the receiving speaker 27. The hook-on, hook-off and dial operations are carried out at the sending or receiving operation section 28, which controls the radio transmitting and receiving circuits 24a and 24b.

The counterpoises 31a–31c in this example are metal projections projecting downward from the lower portion of the casing 20 in three radial directions. They serve to stably support the casing 20 on the top of a desk or similar surface and they are connected to ground terminals of the radio transmitting and receiving circuits 24a and 24b to serve as counterpoises. Each of the counterpoises can be made telescopic.

SIXTH EXAMPLE

Figure 7B:
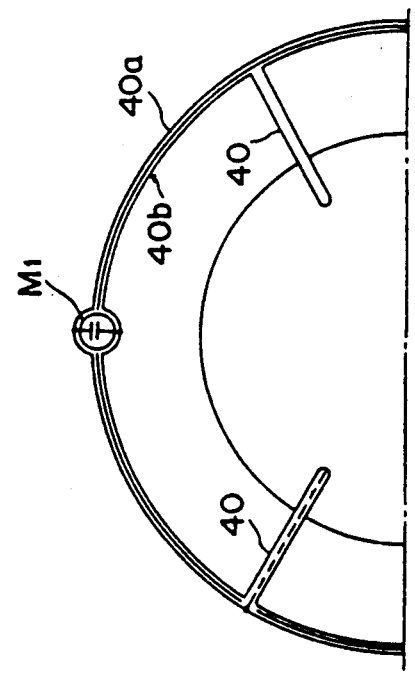
FIGS. 7(a) and 7(b) show the arrangement of a sixth example of the cordless loud-speaking telephone according to the present invention.
Figure 7A:
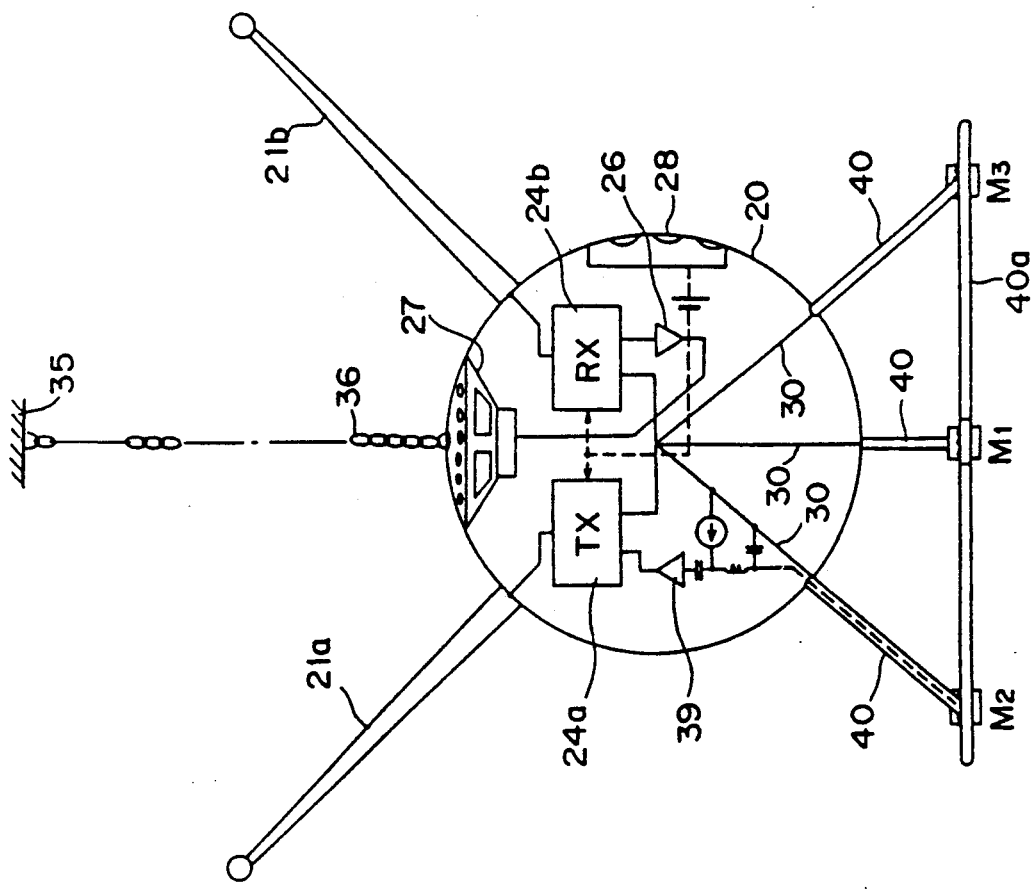

FIGS. 7(a) and 7(b) show a structural view for a sixth example of the cordless loud-speaking telephone according to the present invention. The antenna comprises transmitting and receiving antennas 21a and 21b which are crossed at right angles on their extended image lines. The above-mentioned circuit common to the transmitting and receiving antennas is therefore made unnecessary. Transmitting and receiving frequencies have different frequency bands. Message transmitting microphones $M_1$, $M_2$ and $M_3$ are arranged on the side of the counterpoises 40 which are made in the same manner as the antenna 38 shown in FIG. 6. More specifically, ring shaped counterpoises 40a and 40b are fixed to the tops of the counterpoises 40 and the microphones $M_1$, $M_2$ and $M_3$ are attached to the counterpoises 40a and 40b at a certain interval, as shown in the bottom view of FIG. 7(b). These transmitting microphones $M_1$, $M_2$ and $M_3$ are one-directional, with their directional axes downward, and they are acoustically isolated from the receiving speaker 27, which is located at the top of the casing 20 with its sound-emitting face directed upward. The counterpoises 40a and 40b lead outputs of the microphones and ground potentials of the radio transmitting and receiving circuits 24a and 24b are connected to the counterpoises 40 by lines 30. FIG. 7(a) shows the casing 20 suspended from the ceiling 35 by a handing chain 36, but the casing 20 can be mounted on a table or desk. The transmitting microphones $M_1$, $M_2$ and $M_3$ are non-directional in this case and when their voice receiving faces are directed upward or downward, an elastic member of a material such as rubber or felt may be interposed between the top of the table and the counterpoises 40a, 40b. This would form an appropriate clearance between their voice receiving faces and the top of the table, through which a voice could be input. When arranged in this manner, a voice input directly by a mouth, as well as a voice reflected from the top of the table, can be effectively received by the microphones, thereby enhancing their voice receiving capacities.

SEVENTH EXAMPLE

Figure 8C:
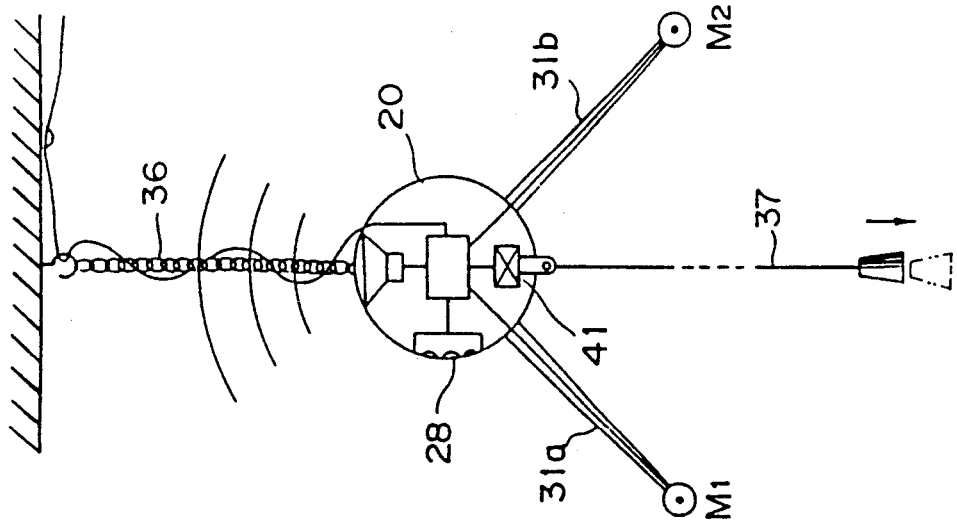
FIGS. 8(a), 8(b) and 8(c) show the arrangement of a seventh example of the cordless loud-speaking telephone according to the present invention.
Figure 8B:
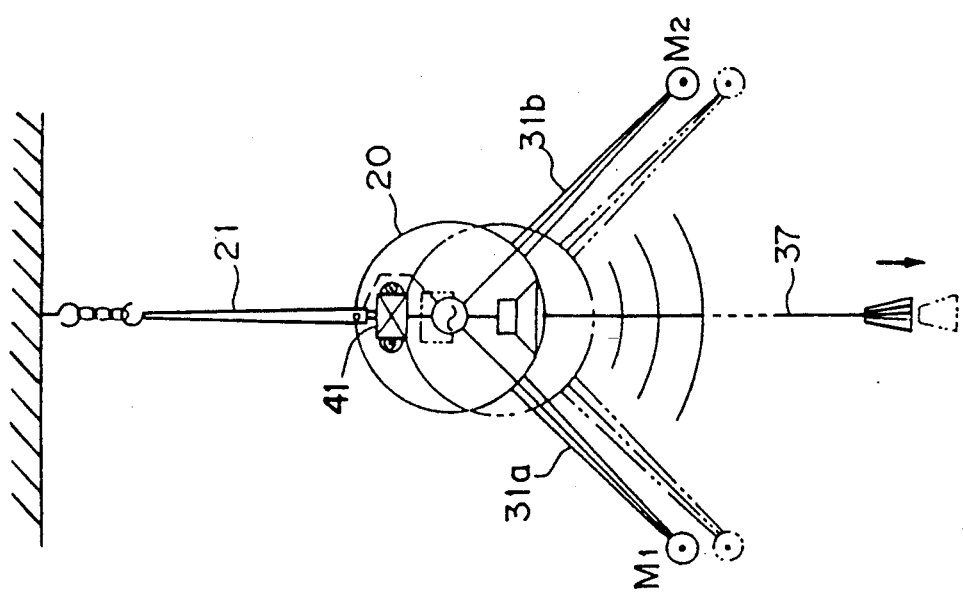
Figure 8A:
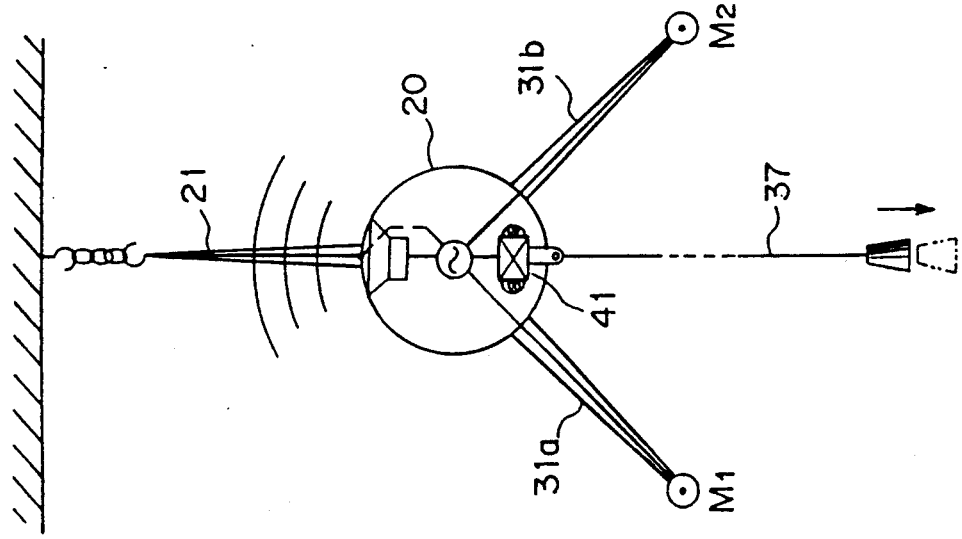

FIGS. 8(a), 8(b) and 8(c) show a structural views for a seventh example of the cordless loud-speaking telephone according to the present invention. A pulling string switch 41 which serves as the hook switch is arranged in the casing 20 and when the pulling string 37 is pulled, the radio transmitting and receiving circuits can be rendered operative or inoperative.

In the example shown in FIG. 8(a), the hook-on and hook-off operations can be executed by the pulling string 37 tied to a control knob which controls the pulling string switch 41 to close and open. In the example shown in FIG. 8(b), the base of the antenna conductor 21, which is located on the side of the hanging member 36, is fixed to the control knob of the pulling string switch 41 and that portion of the antenna base to which the control knob is fixed is fixed to the casing 20 with screws. The whole of the casing 20 including the antenna conductor 21 is hung from the ceiling by hook metal fittings. The pulling string 37 is fixed to the casing 20 and when the pulling string 37 is pulled, moving the whole of the casing 20 downward, the hook-on and hook-off operations can be attained. The pulling string switch 41 shown in FIG. 8(b) has sufficient force to return the casing 20 upward to its original position when the pulling string 37 is released after the casing 20 is pulled down. The example shown in FIG. 8(c) is provided with the sending or receiving operation section 28 in addition to the pulling string switch 41. Therefore, this example is more convenient as a loudspeaking wire telephone. Instead of the chain shown in FIG. 8(c), the means for suspending the casing 20 from the ceiling may be made freely chosen as a wire, a winding reel or a helical cord.

EIGHTH EXAMPLE

FIGS. 9(a) and 9(b) show an eighth example of the cordless loud-speaking telephone according to the present invention. FIG. 9(a) is a side view and FIG. 9(b) is a plan view. The dipole antenna conductors 21a and 21b project outside the upper portion of the casing 20 and equal-length poles 42a and 42b extend outside the upper portion of the casing 20 in opposite directions. The plane of poles 42a and 42b is perpendicular in this case to that of the antenna conductors 21a and 21b. Therefore, the bases of the dipole antenna conductors 21a and 21b are opposed to each other while the bases of the poles 42a and 42b are also opposed to each other. Microphones $M_1$ and $M_2$ are attached to the tops of the poles 42a and 42b.

As in the examples shown in FIGS. 3 and 4, the radio transmitting and receiving circuits 24a and 24b are arranged together with the speaker 27 in the casing 20 and the outputs of the microphones $M_1$ and $M_2$ are applied to the differential amplifier 34 through leads passing through the poles 42a and 42b. A signal which denotes the difference between these outputs is created by the differential amplifier 34 and inputted as a modulated input to the radio transmitting circuit 24a. The legs 31a–31c may be made as counterpoises or only supporting ones, as seen in the cases of the examples shown in FIGS. 3 and 4. As described above, the antenna conductors 21a and 21b extend perpendicular to the poles to the tops of which microphones $M_1$ and $M_2$ are attached. This is to prevent the paired poles and the paired antennas from interfering with the others. A separator means such as a trap circuit or a low-pass filter for separating carrier current (carrier wave) from voice current is not necessarily needed. Even if it is added, it can be made much simpler.

NINTH EXAMPLE

Figures 10A, 10B:
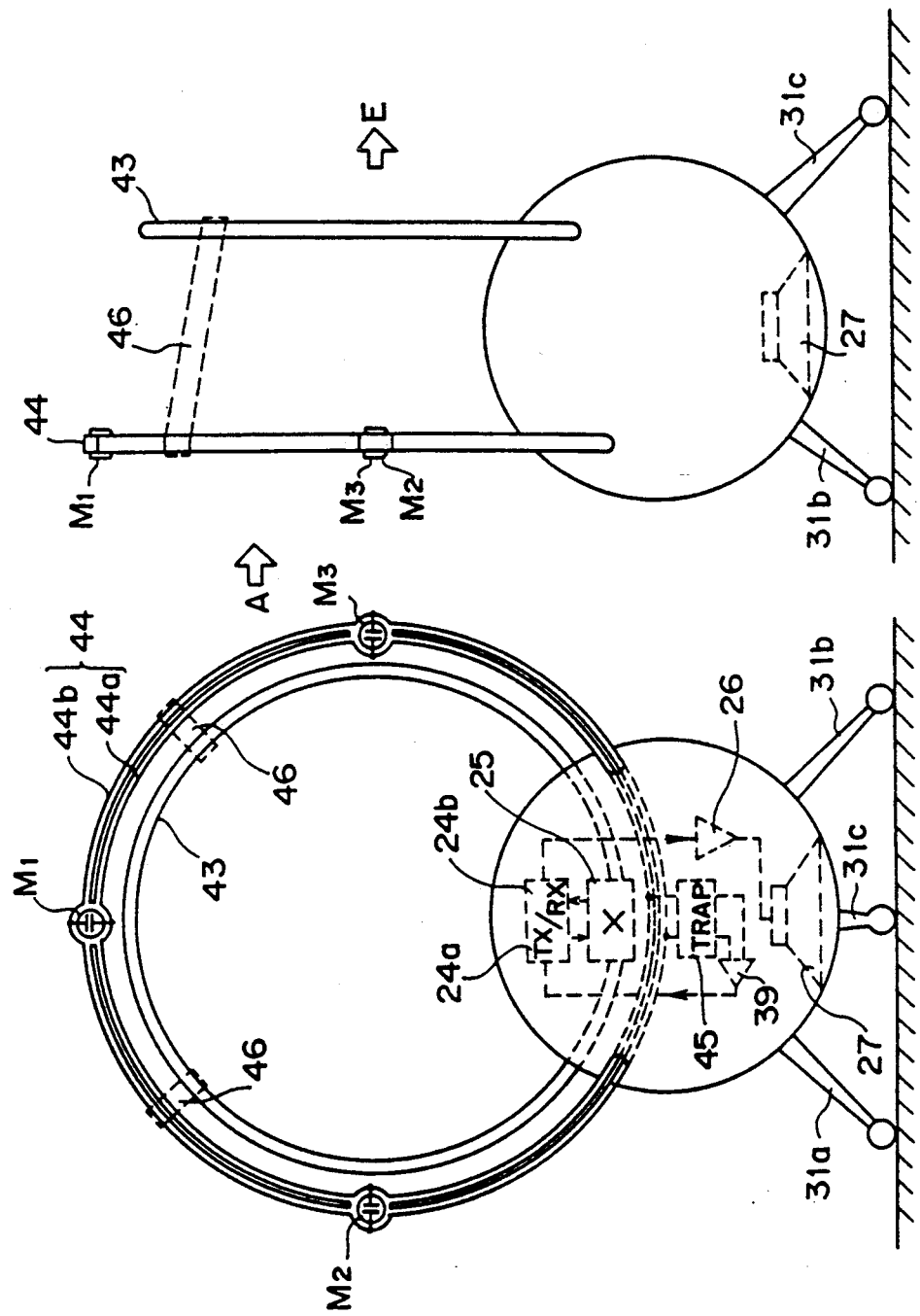
FIGS. 10(a) and 10(b) show the arrangement of a ninth example of the cordless loud-speaking telephone according to the present invention.

FIGS. 10(a) and 10(b) show a structural view for a ninth example of the cordless loud-speaking telephone according to the present invention. FIG. 10(a) is a front view and FIG. 10(b) a side view. A loop-shaped antenna conductor 43, whose ends are fixed to the casing 20, projects outside the upper portion of the casing 20. Another loop-shaped auxiliary antenna conductor 44 (which comprises antenna conductors 44a and 44b) also projects outside the upper portion of the casing 20 and is located outside and parallel to the antenna conductor 43 at intervals of $\lambda/4-\lambda/5$ ($\lambda$ represents the wavelength of the transmitted radio wave), for example, interposed between them. One or more transmitting microphones, $M_1$, $M_2$ and $M_3$ in this example, are attached to the auxiliary antenna conductor 44. The radio transmitting and receiving circuits 24a and 24b and the speaker 27 are arranged in the casing 20, as in the examples shown in FIG. 6. The auxiliary antenna conductors 44a and 44b serve as leads and reflectors or wave directors for picking up outputs from the transmitting microphones $M_1$, $M_2$ and $M_3$. The auxiliary antenna conductors 44a and 44b are connected to a trap circuit 45 where high frequency components are blocked to separate voice output applied from the microphones $M_1$, $M_2$ and $M_3$. The voice output is amplified by the microphone amplifier 39 and a signal which represents the voice output is then inputted as modulated input to the radio transmitting circuit 24a. The antenna conductor 43 and the auxiliary antenna conductor 44 are held and reinforced by spacers 46 at certain spacings.

When the auxiliary antenna conductors 44a and 44b are of longer circumference than the antenna conductor 43, they serve as reflectors to enable clear verbal communication to be established between the sub device and the main device, which is located in the direction shown by arrow E in FIG. 10(b). When the auxiliary antenna conductors 44a and 44b are of shorter circumference than the antenna conductor 43, they serve as wave directors to enable clear verbal communication to be established between the sub-device and the main device, which is located in the direction opposite to direction E in FIG. 10(b).

When microphones $M_1$, $M_2$ and $M_3$ are non-directional, 8-shaped directional characteristics can be created, keeping high sensitivity in the forward and backward directions of loop faces of the antenna conductors, but low sensitivity in the transverse directions. When microphones $M_1$, $M_2$ and $M_3$ are of the one-directional type, their single directional characteristic can be made sharper. Legs 31a–31c can be made as shown in FIGS. 4 and 6.

Voice signals received in each of the above examples are amplified by the amplifier and reproduced through the large speaker. When one telephone is used as a meeting telephone, therefore, the voice can be reproduced by the speaker sufficiently clearly to penetrate the whole of the meeting room. Further, when a voice switch and an echo canceller of low insertion loss are added, howling and echo can be effectively suppressed.

The Possibility of the Utilizing the Invention in the Industrial View

According to the present invention, the receiving speaker can be sufficiently separated from the transmitting microphone. Further, sounds emitted through the receiving speaker can be cancelled and a voice pronounced by the mouth can be efficiently collected in a certain direction by using plural microphones. Therefore, a low cost cordless loud-speaking telephone quite free from howling and echo is made available.

What is claimed is:

1. A cordless loud-speaking telephone comprising a casing, radio transmitting and receiving circuits and a receiving speaker arranged in the casing, an antenna conductor projecting from the casing, a transmitting microphone attached to the antenna conductor which serves as a conductor for voice current of the transmitting microphone and also as a transmitting and receiving antenna, and a frequency band separator means arranged at the base of the antenna conductor, wherein the transmitting microphone is isolated from the receiving speaker by the antenna conductor.

2. A cordless loud-speaking telephone comprising a casing radio transmitting and receiving circuits and a receiving speaker arranged in the casing, a loop-shaped antenna conductor projecting outside the casing with both its ends fixed to the casing, transmitting microphones attached to the antenna conductor and a band separator means arranged at the base of the antenna conductor to separate voice current from carrier wave, wherein outputs of the microphones are applied, as modulated input, to the radio transmitting circuit through the band separator means.

3. A cordless loud-speaking telephone comprising a casing, radio transmitting and receiving circuits and a receiving speaker arranged in the casing, a loop-shaped antenna conductor projecting outside the casing with both its ends fixed to the casing, at least two transmitting microphones attached to the antenna conductor, and a band separator means arranged at the base of the antenna conductor to separate voice current from carrier wave, wherein composed transmitting output of the transmitting microphones is applied, as modulated input, to the radio transmitting circuit through the band separator means.

4. A cordless loud-speaking telephone comprising a casing, radio transmitting and receiving circuits and a receiving speaker arranged in the casing, a loop-shaped counterpoise arranged under the casing and microphones attached to the counterpoise.

5. A cordless loud-speaking telephone comprising a casing, radio transmitting and receiving circuits and a receiving speaker arranged in the casing, a loop-shaped counterpoise arranged under the casing and at least two transmitting microphones attached to the counterpoise, wherein composed transmitting output of the transmitting microphones is applied, as modulated input, to the radio transmitting circuit.

6. A cordless loud-speaking telephone comprising a casing shaped to be hung or suspended, radio transmitting and receiving circuits and a receiving speaker arranged in the casing, antenna conductors projecting outside the casing, transmitting microphones attached to the antenna conductors such that they are isolated from the receiving speaker, and a pulling string switch attached to the casing to switch on and off the wiring at the time of transmission and reception.

7. A cordless loud-speaking telephone comprising a casing shaped to be hung or suspended, radio transmitting and receiving circuits and a receiving speaker arranged in the casing, antenna conductors projecting outside the casing, microphones attached to the antenna conductors such that they are isolated from the receiving speaker, a suspender for accepting the whole load of the casing in which the radio transmitting and receiving circuits and the like are housed, and a pulling string switch for switching on and off every time the casing is pulled down.

8. A cordless loud-speaking telephone comprising a casing, radio transmitting and receiving circuits and a receiving speaker arranged in the casing, a loop-shaped antenna conductor projecting outside the casing with both its ends fixed to the casing, an auxiliary antenna conductor arranged parallel to the antenna conductor with a certain gap provided from the antenna conductor, transmitting microphones attached to the auxiliary antenna conductor, and a band separator means arranged at the base of the auxiliary antenna conductor to separate voice current from carrier wave, wherein an output of the microphones is applied, as modulated input, to the radio transmitting circuit through the band separator means provided on the base of the auxiliary antenna conductor and for separating the voice current from the carrier.

9. A cordless loud-speaking telephone comprising a casing, radio transmitting and receiving circuits and a receiving speaker arranged in the casing, a loop-shaped antenna conductor projecting outside the casing with both its ends fixed to the casing, a loop-shaped auxiliary antenna conductor arranged parallel to the antenna conductor with a certain gap interposed between them, at least two transmitting microphones attached to the auxiliary antenna conductor, and a band separator means arranged at the base of the auxiliary antenna conductor to separate voice current from carrier wave, wherein composed transmitting output of the transmitting microphones is applied, as modulated input, to the radio transmitting circuit through the band separator means.

10. A cordless loud-speaking telephone comprising a casing, radio transmitting and receiving circuits and a receiving speaker arranged in the casing, the dipole antenna conductors projecting outside the casing, and microphones attached to equal-length poles extending from the casing in opposite directions in a plane perpendicular to the plane of the antenna conductors, differential transmitting output of the microphones is applied, as modulated input, to the radio transmitting circuit.

11. A cordless loud-speaking telephone comprising a casing, radio transmitting and receiving circuits and a receiving speaker arranged in the casing, an antenna conductor projecting outside from the casing and connected to the radio transmitting and receiving circuits, a transmitting microphone attached substantially to the top of the antenna conductor, and a band separator means for separating voice current from a carrier wave arranged at a current supply section to send the voice current to a transmitting modulator circuit.

12. The cordless loud-speaking telephone according to claim 11 wherein said casing is provided with counterpoises connected to ground terminals of the radio transmitting and receiving circuits.

13. A cordless loud-speaking telephone comprising a casing, radio transmitting and receiving circuits, a receiving speaker, antenna conductors and counterpoises projecting outside the casing, and transmitting microphones attached substantially to the tops of the counterpoises.

14. The cordless loud-speaking telephone according to claim 13 wherein the counterpoises are plural in number, the microphones are attached substantially to the tops of the counterpoises which are projected from the casing such that each of the microphones is separated from the receiving speaker by the same distance, and the outputs of the microphones are applied, as modulated input, to the radio transmitting circuit under polarities that cancel the outputs.

15. The cordless loud-speaking telephone according to claim 13 wherein the antenna conductors are plural in number, the microphones are attached substantially to the tops of these antenna conductors which are projected from the casing such that each of the microphones is separated from the receiving speaker by the same distance, and outputs of the microphones are applied, as modulated input, to the radio transmitting circuit through the band separator means which is arranged in a current supply section to separate a voice current from a carrier wave, said outputs of the microphones being applied to the radio transmitting circuit in this case under polarities that cancel the outputs.

16. The cordless loud-speaking telephone according to claim 15 wherein the plural microphones are attached to the top and the middle of the antenna conductor with a certain gap interposed between them, and outputs of the plural microphones are composed and applied, as modulated input, to the radio transmitting circuit through a band separator means which is arranged at the current supply section to separate a voice current from a carrier wave.

17. The cordless loud-speaking telephone according to claim 15 wherein the plural microphones are attached to the top and the middle of the counterpoise with a certain gap interposed between them, and the outputs of the plural microphones are composed and this composed output is applied, as modulated input, to the radio transmitting circuit.

* * * * *